United States Patent
Mortimer

(10) Patent No.: US 9,046,412 B2
(45) Date of Patent: Jun. 2, 2015

(54) COMPACT INTERFEROMETER SPECTROMETER

(75) Inventor: Hugh Mortimer, Reading (GB)

(73) Assignee: THE SCIENCE AND TECHNOLOGY FACILITIES COUNCIL, Oxfordshire (GB)

( * ) Notice: Subject to any disclaimer, the term of this patent is extended or adjusted under 35 U.S.C. 154(b) by 337 days.

(21) Appl. No.: 13/522,665

(22) PCT Filed: Jan. 14, 2011

(86) PCT No.: PCT/GB2011/000045
§ 371 (c)(1),
(2), (4) Date: Jul. 17, 2012

(87) PCT Pub. No.: WO2011/086357
PCT Pub. Date: Jul. 21, 2011

(65) Prior Publication Data
US 2012/0281223 A1    Nov. 8, 2012

(30) Foreign Application Priority Data

Jan. 18, 2010   (GB) .................................. 1000775.5

(51) Int. Cl.
| | | |
|---|---|---|
| *G01B 9/02* | (2006.01) | |
| *G01J 3/02* | (2006.01) | |
| *G01J 3/453* | (2006.01) | |

(52) U.S. Cl.
CPC .............. *G01J 3/02* (2013.01); *G01B 9/0209* (2013.01); *G01J 3/0208* (2013.01); *G01J 3/4531* (2013.01); *G01J 3/4532* (2013.01)

(58) Field of Classification Search
CPC ........ G01C 19/58; G01C 19/64; G01C 19/66; G01C 19/661; G01J 3/02; G01J 3/0208; G01J 3/4531; G01J 3/4532; G01J 9/0215; G01B 9/02032; G01B 9/02098
USPC ................................................. 356/456, 483
See application file for complete search history.

(56) References Cited

U.S. PATENT DOCUMENTS

| | | | |
|---|---|---|---|
| 4,383,763 A | | 5/1983 | Hutchings et al. |
| 4,850,708 A | * | 7/1989 | Moore et al. ................... 356/459 |

(Continued)

FOREIGN PATENT DOCUMENTS

| | | |
|---|---|---|
| EP | 0732582 A2 | 9/1996 |
| GB | 1102061 | 2/1968 |
| GB | 1254911 | 11/1971 |
| GB | 1 337 273 | 11/1973 |
| GB | 1 388 418 | 3/1975 |
| JP | 1-203936 A | 8/1989 |

OTHER PUBLICATIONS

Agladze, N.I. et al., "Miniaturization of holographic Fourier-transform spectrometers", Applied Optics, Dec. 20, 2004, pp. 6568-6579, vol. 43, No. 36.

(Continued)

*Primary Examiner* — Jonathan Hansen
(74) *Attorney, Agent, or Firm* — Birch, Stewart, Kolasch & Birch, LLP

(57) ABSTRACT

An interferometer is disclosed, such as may be incorporated into a hand-held spectrometer. The interferometer comprises enclosed path optics and a detector, the enclosed path optics comprise at least two reflecting elements and a beamsplitter, the beamsplitter is arranged to divide an input beam into first and second beams. The enclosed path optics are arranged to direct the first and second beams in opposite directions around paths enclosing an area and to output the first and second beams towards the detector. The enclosed path optics also focus the first and second beams onto the detector. The detector is arranged to detect a pattern produced by interference of the first and second beams. In a preferred embodiment the two reflecting elements are a pair of concave mirrors, and the enclosed path optics enclose a triangular area. The use of concave mirrors for both reflection and focussing provides the interferometer with compactness.

28 Claims, 8 Drawing Sheets

(56) References Cited

U.S. PATENT DOCUMENTS

| | | |
|---|---|---|
| 4,946,280 A | 8/1990 | Horton |
| 4,976,542 A | 12/1990 | Smith |
| 5,493,398 A | 2/1996 | Pfister |
| 5,495,334 A | 2/1996 | Nagoshi et al. |
| 5,885,531 A | 3/1999 | Heffelfinger et al. |
| 6,721,057 B1 | 4/2004 | Reininger |
| 2007/0223001 A1 | 9/2007 | Feugnet et al. |
| 2008/0174786 A1 | 7/2008 | Takizawa et al. |

OTHER PUBLICATIONS

Berlinghieri, J.C. et al., "A CCD Fourier Transform Spectrometer," CCDs in Astronomy: Proceedings of the Conference, Tucson, Arizona, Sep. 6-8, 1989, pp. 374-379.

Ezhevskaya, T.B. et al., "Fourier spectrometer with a movable light divider", Instruments and Experimental Techniques, 1981, pp. 1511-1513, vol. 24, Pt. 6.

Katzberg, S.J. et al., "Performance Assessment of the Digital Array Scanned Interferometer (DASI) Concept", NASA Technical Paper 3570, Aug. 1996.

Lucey, P.G. et al., "SMIFTS: A cryogenically-cooled spatially-modulated imaging infrared interferometer spectrometer", Proceedings SPIE, 1993, pp. 130-141, vol. 1937, Pt. 130.

Okamoto, T. et al., "Fourier transform spectrometer with a self-scanning photodiode array", Applied Optics, Jan. 15, 1984, pp. 269-273, vol. 23, No. 2.

Smith, W.H. et al., "Digital Array Scanned Interferometers for Astronomy", Experimental Astronomy, 1991, pp. 389-405, vol. 1.

Zhan, G., "Static Fourier-transform spectrometer with spherical reflectors", Applied Optics, Jan. 20, 2002, pp. 560-563, vol. 41, No. 3.

\* cited by examiner

COMPACT INTERFEROMETER SPECTROMETER

TECHNICAL FIELD

The present invention relates to a compact interferometer, such as may be incorporated into a hand held spectrometer device. The device can be manufactured such that there are no moving parts and is therefore suitable for use in hostile environments.

BACKGROUND ART

Michelson and Sagnac interferometers are well known. A Michelson interferometer, such as shown in FIG. 1, comprises a partially reflecting mirror 10 and a pair of reflecting mirrors 21, 22. The partially reflecting mirror 10 divides the light into two components. The mirrors 21, 22 and partially reflecting mirror 10 are arranged so that light passes along two linear paths, namely legs 31, 32. Each component travels a return path along a different one of the legs. The optical path length along one of the legs 32 is adjustable. The components recombine at a focal plane to form fringes. The components are combined through a lens 40, arriving at the lens at equal angles of inclination. By displacing one of the reflecting mirrors 22 in the direction of the beam, the optical path difference between the two legs can be varied. The fringes 55 usually take the form of concentric rings. As the path difference is changed the separation between fringes becomes greater or smaller. If the path length difference is varied linearly with time, and a detector 50 is placed at the centre of the annuli of fringes 55, the signal from the detector will vary sinusoidally with a period determined by the wavelength and path difference.

One of the advantages of the Michelson interferometer is that it can accept input rays incident over a relatively wide angular range. However, in the interference fringes any spatial information about the source is lost because it is distributed uniformly in the interference rings.

A Sagnac interferometer is shown in FIG. 2. The Sagnac interferometer also comprises a partially reflecting mirror 110, and a pair of reflecting mirrors 121, 122. The partially reflecting mirror divides the light, as for the Michelson interferometer, but instead of the two components travelling along legs the position of the reflecting mirrors is changed such that the two components are not reflected directly back to the partially reflecting mirror 110 but are reflected to the other reflecting mirror 121 or 122. Hence, the components travel along similar enclosed paths but in opposite directions. For this reason the Sagnac interferometer is sometimes known as a common path interferometer. The two components exit via the partially reflecting mirror 110 and through lens 140 to produce fringes 155. Different to the Michelson, the fringes 155 are linear rather than circular.

If a detector 150 is placed in the interference pattern, and one of the mirrors 122 is scanned as shown by the arrow in FIG. 2, the signal from the detector will vary sinusoidally. Alternatively, moving a detector across the interference pattern, the signal will also vary sinusoidally.

Another difference between the Sagnac and Michelson interferometers is that the Michelson requires very accurate positioning of the mirrors for each arm, whereas the position of the mirrors for the Sagnac device is more tolerant because the path difference is produced as a result of the triangular path of the beams being asymmetric and providing shear of the two beams.

Interferometers based on the Sagnac arrangement described above have been reported by Berlinghieri J. C. et al., "A CCD Fourier Transform Spectrometer", CCDs in Astronomy: Proceedings of the Conference, Tucson, Ariz., 6-8 Sep., 1989. The device reported used a CCD array to detect the interference pattern. Okamoto T., "Fourier Transform Spectrometer with Self-Scanning Photodiode Array", Applied Optics, Vol. 23, No. 2, 1984, describes a similar device but incorporates an additional mirror to fold the output beam towards the detector. Okamoto also considers that the optical throughput of this system is larger than that of Michelson type interferometers, because in such interferometers, the resolving power is limited by the extent of the source. Lucey P. G. et al. "SMIFTS: A Cryogenically Cooled, Spatially Modulated Imaging Infrared Interferometer Spectrometer", Proc. SPIE, Vol. 1937, 130 (1993) also describes a similar device, but additionally includes a cylindrical lens to reimage the input aperture at the detector.

Other interferometer configurations have also been considered such as the DASI (Digital Array Scanned Interferometer) discussed by Katzberg and Statham in NASA Technical paper 3570, August 1996. This device comprises a Wollaston prism and a detector array.

Many of the above devices are cumbersome, require tight control of position and quality of components, and cannot provide a real-time output spectrum.

SUMMARY OF THE INVENTION

The present invention provides an interferometer, comprising beam division or path differencing optics and a detector, wherein: the beam division or path differencing optics comprise at least two reflecting elements and a beamsplitter, the beam splitter is arranged to divide an input beam into first and second beams, the first reflecting element is arranged to direct the first beam along a first path towards a detector and the second reflecting element is arranged to direct the second beam along a second path towards the detector, the first and second paths having an optical path difference; the beam division or path differencing optics are arranged to focus the first and second beams onto the detector; and the detector is arranged to detect a pattern produced by interference of the first and second beams. The beam division or path differencing optics divide an input beam into two beams and direct the two beams along paths to recombine at the detector. The paths of the two beams have an optical path difference or a variation in optical path difference along the length of the detector. The beam division or path differencing optics first function is division of the optical beam into first and second beams, and may alternatively be known as offset optics.

The interferometer of the present invention has the advantage that the focussing of the two beams onto the detector is provided by the beam division or path differencing optics, such as the reflecting elements. This provides a compact interferometer.

The number of reflecting elements is preferably two and these are arranged to focus the beams onto the detector such that an interferogram is produced across the detector plane.

The beam division or path differencing optics may be arranged such that the first and second beams are directed in opposite directions around paths enclosing an area.

The first and second reflecting elements may be concave mirrors.

The present invention also provides an interferometer, comprising enclosed path optics and a detector, wherein: the enclosed path optics comprise at least two reflecting elements and a beamsplitter, the beamsplitter is arranged to divide an input beam into first and second beams, the enclosed path optics are arranged to direct the first and second beams in opposite directions around paths enclosing an area and to output the first and second beams towards the detector; the enclosed path optics are arranged to focus the first and second beams onto the detector; and the detector is arranged to detect a pattern produced by interference of the first and second beams. The enclosed path is the path enclosing an area that the beams cycle around once before being directed towards the detector. The two beams are counter propagating and may therefore be considered counter cyclic. The enclosed paths result in the interferometer sometimes being known as a common path interferometer. However, the precise paths taken by the two beams are not exactly opposite because when the beams leave the beamsplitter in the direction of the detector, the beams leave from slightly different positions and at slightly different angles. That is the two beams are separated by a shear distance as they pass the beamsplitter.

The advantage of the interferometer described above is that the focussing function is incorporated into the enclosed path optics, such as the mirrors, so the number of components is reduced. In particular, no output Fourier optics are required so the device can be made smaller and more compact. Another advantage is that the interferometer can be arranged such that it does not require moving parts to generate the interference pattern.

The reflecting elements are preferably mirrors, but may comprise diffraction gratings. In one embodiment the two reflecting elements may be formed together as one unit.

The detector samples an interferogram produced by the interference of the first and second beams.

The beam focussing of the enclosed path optics may be provided by curvature of at least one of the reflecting elements. The beam focussing of the enclosed path optics may be provided by curvature of two of the reflecting elements.

The curvature of at least one of the reflecting elements may be arranged to focus the first and second beams onto the detector such that the shape of the optical field at the image plane substantially matches the shape of the detecting surface of the detector. The curvature of at least one of the reflecting elements may be arranged to focus the first and second beams such that the image plane has a planar optical field.

The interferometer may comprise two reflecting elements, wherein the beamsplitter and two reflecting elements may be arranged such that the first beam is directed by the beamsplitter to a first of the two reflecting elements and the second beam is directed by the beamsplitter to a second of the two reflecting elements.

The first of the reflecting elements may be arranged to direct the first beam to the second of the reflecting elements, and the second of the reflecting elements may be arranged to direct the second beam to the first of the reflecting elements, and the second and first reflecting elements may be arranged to direct the first and second beams respectively to the beamsplitter.

The beamsplitter may produce the first and second beams by transmission and reflection respectively.

The beamsplitter may direct the first and second beams from the enclosed path to the detector. The beamsplitter may direct the first and second beams to the detector by transmission and reflection respectively.

The interferometer may further comprise input optics to collimate the input beam. For example, a telescope or binocular arrangement.

The curvature of the two reflecting elements may be the same, and at least one of the reflecting elements may be concave.

The detector may be arranged to detect along a line the pattern produced by interference of the first and second beams. The detector is preferably a linear array of sensors.

The detector may comprise at least one sensor arranged to move to scan along a line.

The enclosed paths may be triangular, square, or any other cyclic shape.

The reflecting elements and beamsplitter may be fixed relative to each other. The detector may be fixed relative to the enclosed path optics.

Preferably, the beamsplitter may divide the input beam into first and second beams of substantially equal intensity.

The enclosed path optics, or reflecting elements and beamsplitter, may be formed monolithically.

The detector is arranged to output a signal indicative of the spatial variation in the interference pattern.

The present invention also provides a spectrometer comprising the interferometer described above, and further comprising an analyser arranged to provide an indication of wavelengths present in the input beam based on a Fourier transform of the interference pattern.

The present invention further provides an imaging spectrometer comprising the interferometer described above, wherein the detector is arranged to detect in 2-dimensions the pattern produced by combining the first and second beams. In such an embodiment, the detector may be arranged to detect in one direction the spatially varying pattern produced by interference of the first and second beams, and detect in a second direction image information about the input beam. The interferometer may be configured as a pupil plane interferometer or an image plane interferometer. The former requires scanning to produce a complete image, whereas the latter instead requires scanning to produce a complete interferogram. The pupil plane interferometer is preferable for use as a spectrometer because no movement is required to obtain an interferogram and thus a complete wavelength spectrum.

Preferably, the detector is a 2-dimensional array of sensors, but alternatively the detector may be a linear array of sensors arranged to move along a line to scan an area.

The imaging spectrometer may further comprise an analyser arranged to provide an indication of wavelengths present in the input beam, and image information regarding the input beam.

The present invention also provides a Sagnac interferometer, wherein one or more of the mirrors in the enclosed path are curved so as to contribute to focussing of the counter cyclic beams onto the detector. This is a modified Sagnac interferometer in which the Fourier optics are incorporated into the enclosed or cyclic optical path.

The present invention also provides a Fourier transform spectrometer, comprising: two reflecting elements, a beamsplitter, and a detector, wherein the beamsplitter is arranged to divide an input beam into first and second beams, the two reflecting elements and beamsplitter are arranged to direct the first and second beams in opposite directions around paths enclosing an area and output the first and second beams towards the detector; an optical element within the enclosed path focuses the beams on the detector; and the detector is arranged to detect a pattern produced by interference of the first and second beams.

BRIEF DESCRIPTION OF THE DRAWINGS

Embodiments of the present invention, along with aspects of the prior art, will now be described with reference to the accompanying drawings, of which.

DETAILED DESCRIPTION OF THE PREFERRED EMBODIMENTS

Figure 3:
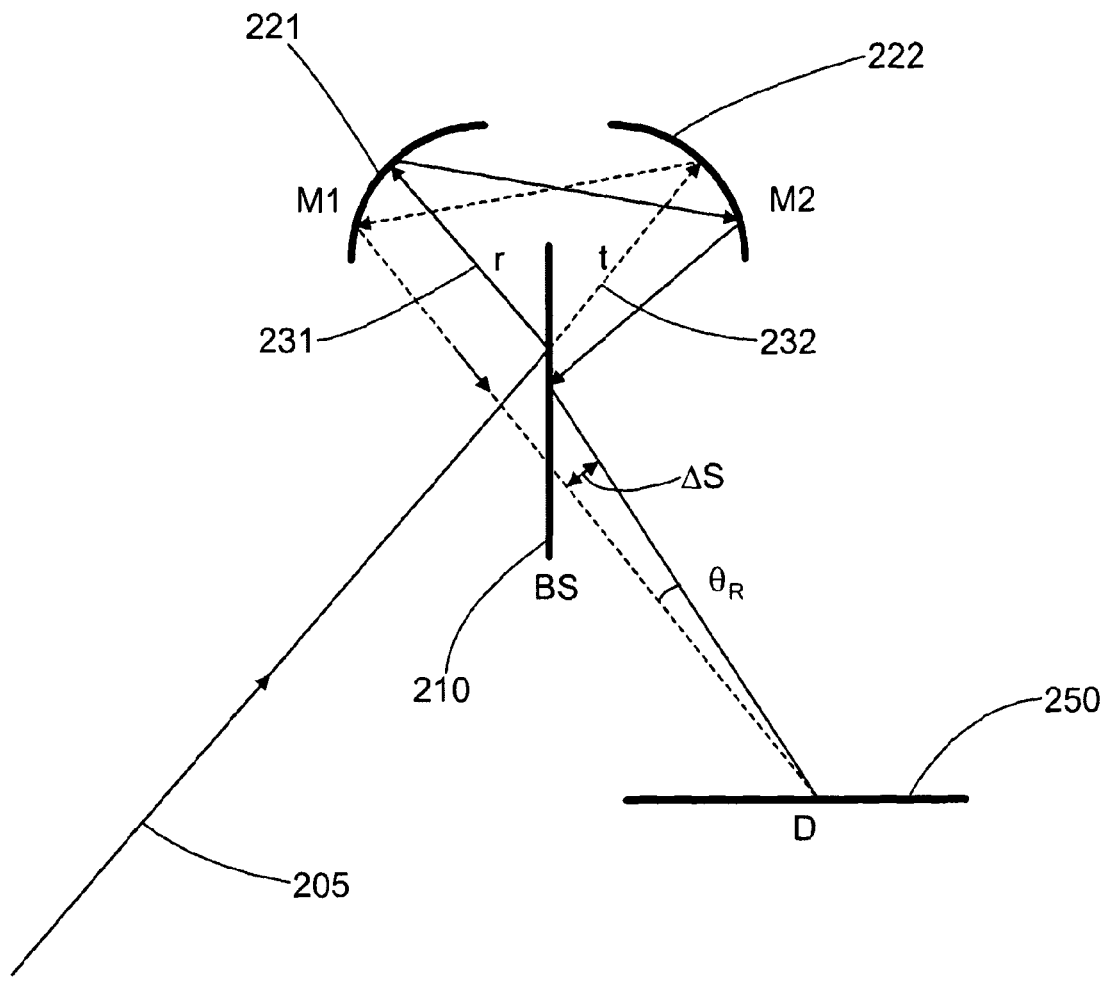
FIG. 3 is a schematic illustration of an interferometer according to an embodiment of the present invention.

FIG. 3 shows an interferometer according to the present invention. The interferometer comprises a detector 250 and enclosed path optics. The enclosed path optics cause an input beam to be divided into first and second beams which then travel in opposite directions around paths enclosing areas, that is, the paths are counter cyclic.

The enclosed path optics include a beamsplitter or light divider 210, and two reflecting elements such as mirrors 221, 222. The beamsplitter 210 may be a partially reflecting mirror, a pellicle beamsplitter, a beamsplitter cube, a plate beamsplitter, etc. The mirrors 221, 222 may be curved having the same curvature as each other or may have different curvatures. The curvature is so as to provide a concave mirror. The detector 250 is preferably a sensor array, but a single sensor scanned spatially may also be used. The detector 250 is located at the image plane.

The beamsplitter is preferably arranged at 45° to the angle of incidence of an input beam of light or radiation 205. The input beam is divided into two beams by the light divider or beamsplitter 210. For beamsplitters of the types mentioned above, the beamsplitter provides a reflected beam 231 (shown by dashed line) and a transmitted beam 232 (shown by solid line). Adjusting the angle of incidence of the input beam 205 at the beamsplitter may be used to adjust the ratio of amplitudes of the transmitted and reflected beams. Preferably, the beamsplitter is designed to provide a 50:50 amplitude split between the transmitted and reflected beams at a 45° angle of incidence of the input beam. However, many other configurations are possible. The two mirrors 221, 222 are positioned at approximately equal, but not precisely equal, distances and angles from the beamsplitter. The first mirror 221 is positioned at the front side of the beamsplitter on the same side as the input beam 205, and is arranged to receive the reflected beam 231. The second mirror 222 is positioned at the rear side of the beamsplitter 210 on the opposite side to the input beam 205, and is arranged to receive the transmitted beam 232.

At the first mirror 221 beam 231, reflected from the beamsplitter, is again reflected such that it is directed towards second mirror 222. Beam 231 is reflected again at second mirror 222 and is directed towards beamsplitter 210. At the beamsplitter, beam 231 is reflected towards detector 250 at the image plane.

At the second mirror 222 beam 232, transmitted through the beamsplitter, is reflected such that it is directed towards first mirror 221. Beam 232 is reflected again at first mirror 221 and is directed towards beamsplitter 210. At the beamsplitter, beam 232 is transmitted through the beamsplitter towards detector 250 at the image plane.

The two beams 231, 232, travel around a loop or area in opposite directions. As shown in FIG. 3, the first beam 231 travels BS-M1-M2-BS-D, and the second beam 232 travels BS-M2-M1-BS-D.

As the beams 231 and 232 leave the beamsplitter for the second time they are slightly displaced with respect to each other, that is, the path around the optical system introduces shear between the two beams. The shear is a result of the slight differences in positions of the two mirrors 221, 222. Interference results from a difference in relative phases between the two beams when they recombine at the image plane. The interference pattern at the detector is known as an interferogram (see FIG. 8a), and is a result of each beam forming an image of the source and because the two images are coherently generated from the same source. The Fourier transform of the interferogram provides a spectrum (see FIG. 8b) of wavelengths present in the input beam. FIGS. 8a and 8b will be discussed in more detail later.

We note that the path difference between the two paths provides phase difference. The path difference is proportional to the shear distance $\Delta S$ and the shear angle $\theta_R$ as shown in FIG. 3. The path difference $\delta$ is given by $$\delta = \Delta S \times \sin \theta_R$$

Figure 4:
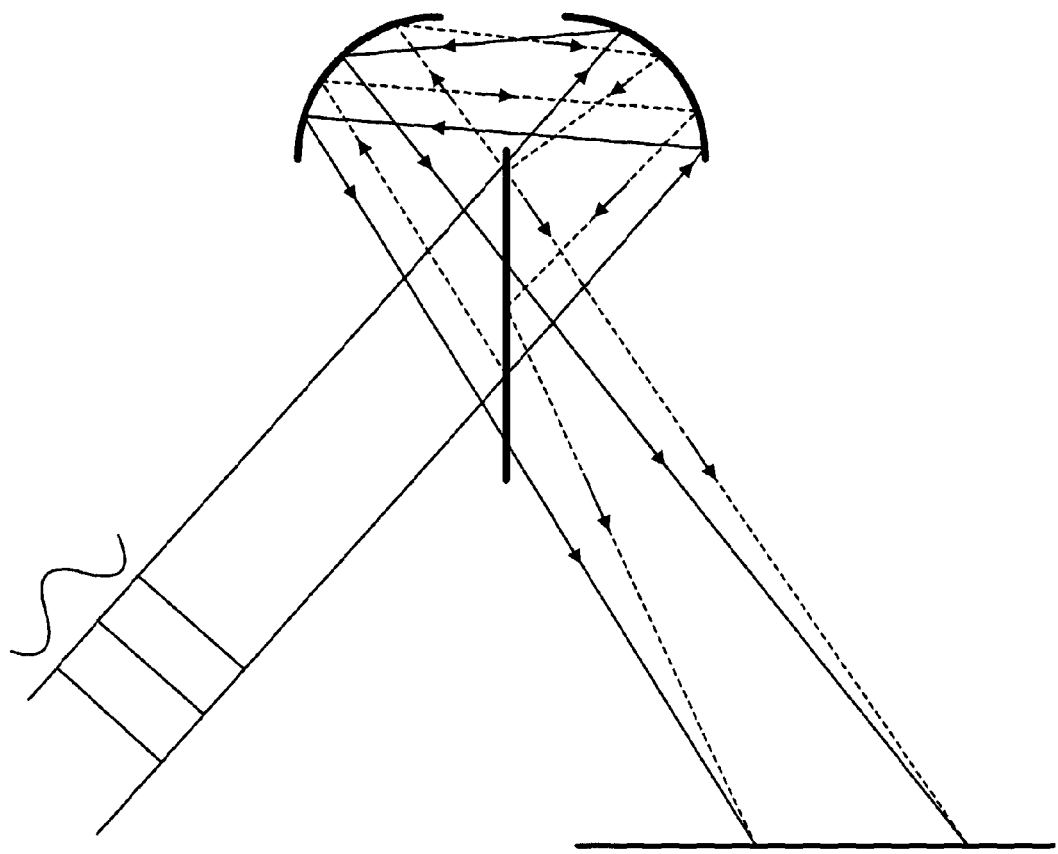
FIG. 4 is a ray trace diagram showing the extremities of a beam travelling around the interferometer of FIG. 3.
Figure 5:
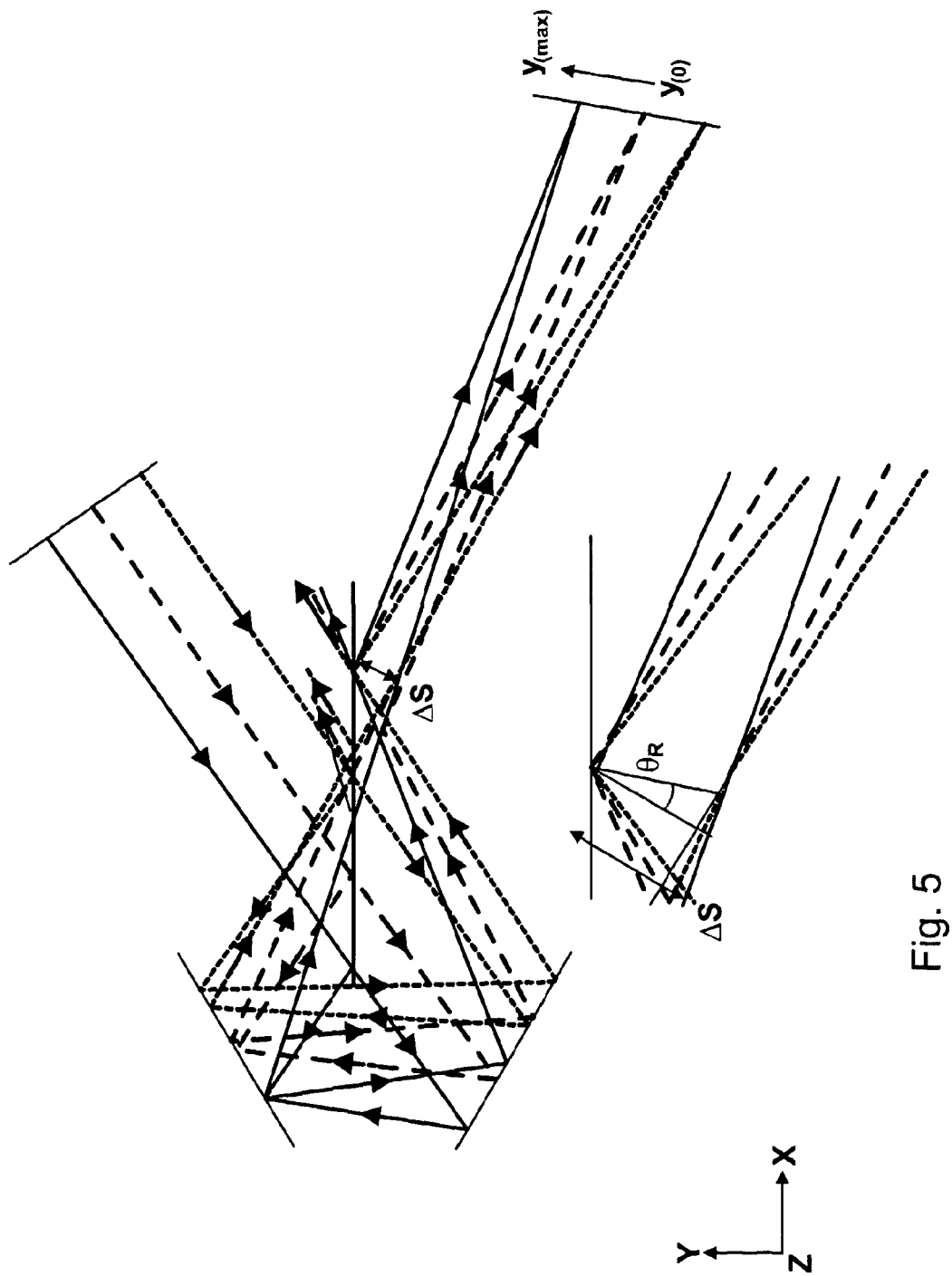
FIG. 5 is a ray trace diagram showing the extremities and centre of a beam travelling around the interferometer of FIG. 3.

FIGS. 4 and 5 show the two extremities of a beam incident on the interferometer. The extremities of the beam will interfere at the image plane depending on the actual path length difference. For example, the path difference will vary along image plane y as shown in FIG. 5. This figure has lines representing three optical paths which are the two extremities of the beam and the centre of the beam. The shear angle is also the recombination angle and hence, $$\sin \theta_R = \frac{y}{F}$$

where F is a measure of the focal length of the optical system.

As the shear angle $\theta_R$ increases away from zero, the distance along the focal plane y will vary giving $$\delta = \frac{y \times \Delta S}{F}$$

The centre of the interference fringes will occur at a position of zero path difference ZPD. This may be considered the y(0) position on the image plane.

Figure 6:
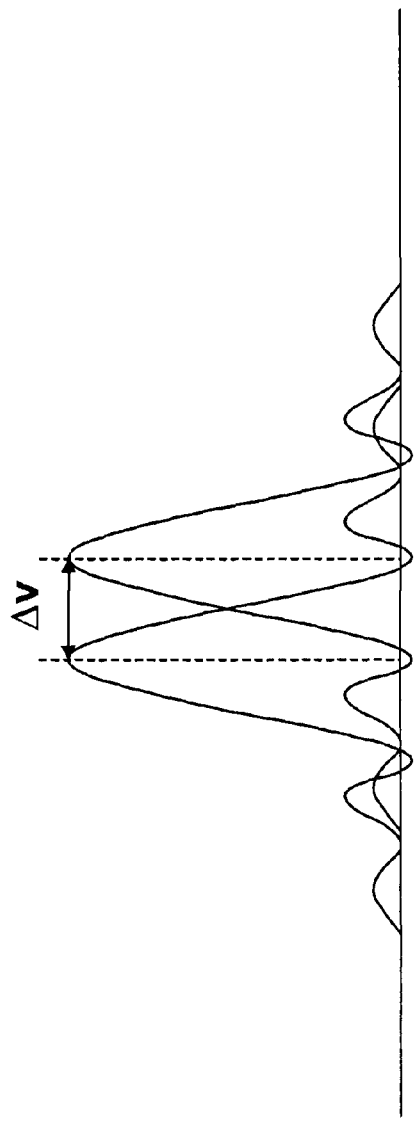
FIG. 6 is a diagram illustrating the Rayleigh Criterion for resolving two features in an image.

The optical path difference is useful in determining a figure of merit for the interferometer. The Rayleigh Criterion defines the minimum resolvable separation, or resolution, for features at an image plane. For spectral resolution, as shown in FIG. 6, this is given by the separation $\Delta v$ between two images or features where the first diffraction minimum of one image or feature coincides with the maximum of another. The resolution has been determined (by Griffiths, 2002) to be given by $$\Delta v_{max} = \frac{0.73}{\delta_{max}}$$

where $\delta_{max}$ is the maximum path difference achieved by the interferometer as a result of the maximum obtainable shear angle.

Thus, a larger shear separation or shear angle provides a better resolution. Accordingly increasing the shear angle spreads out the interference pattern to a greater extent at the detector, so a longer detector may also be needed. If the detector is already lengthy then a detector with improved signal to noise ratio or better digital to analogue conversion resolution may help to provide a more accurate data representation of the interferogram. This can be used for better curve fitting and Fourier transformation to produce the wavelength spectrum. Hence to attain a certain resolution, the parameters of lengths of detector array and optical path length difference can be traded to fit available components. Decreasing the pixel pitch may also be used to increase resolution. Increasing the detector length, or resolution in the interferometer of the current invention corresponds to improving the resolution of a Michelson interferometer by scanning the movable mirror over a greater distance. In both cases an increase in path difference results.

Preferably, the mirrors 221, 222, are curved to provide a flat field in the image plane. The detector is then located at the image plane. If the detector is not exactly at the image plane but is oriented at an angle to it then the interferogram will be distorted, that is there will be non-linearity in the interferogram as we move away from ZPD. The above assumes that a flat detector is used. If the detector instead has a curvature, the field at the image plane should match the curvature of the detector. The mirrors are designed to provide a curvature or flatness of the image plane to match the shape of the detector. The mirrors 221,222 are preferably of identical spherical curvature, but since this may require two mirrors to be custom made for the device, it is possible to use one commercial-off-the-shelf mirror and have the other custom made to provide the required field shape at the detector. To reduce aberrations one or both mirrors may be aspheric. In other embodiments, other optical components in the enclosed path or counter cyclic paths may be used to provide focussing on the detector, but the preferred embodiments is to incorporate the focussing effect in the mirrors 221, 222.

The field shape at the detector is also determined by the type of object or source being examined. The input beam from the object or source is preferably collimated, such as from a laser source or object at infinity. If the object or source light is not collimated a simple imaging system can be used at the input to the interferometer. For example, a binocular or telescope imaging system can be used to provide an object or source appearing at infinity. Such systems may include open path telescopes, optical fibre fed light, or an Attenuated Total Reflectance (ATR) optical set up as used in infrared spectroscopy. Input optical systems such as telescopes and binoculars change the formation of the interferogram at the detector. This is discussed in more detail later. The shape of the mirrors can also be used to correct for features in the input beam. For example, if the phase of the light in the input beam is not matched in orthogonal axes, one of the mirrors may have radii of curvature which are not equal so instead of forming a concave mirror which is spherically curved, it is elliptically curved.

Figure 7:
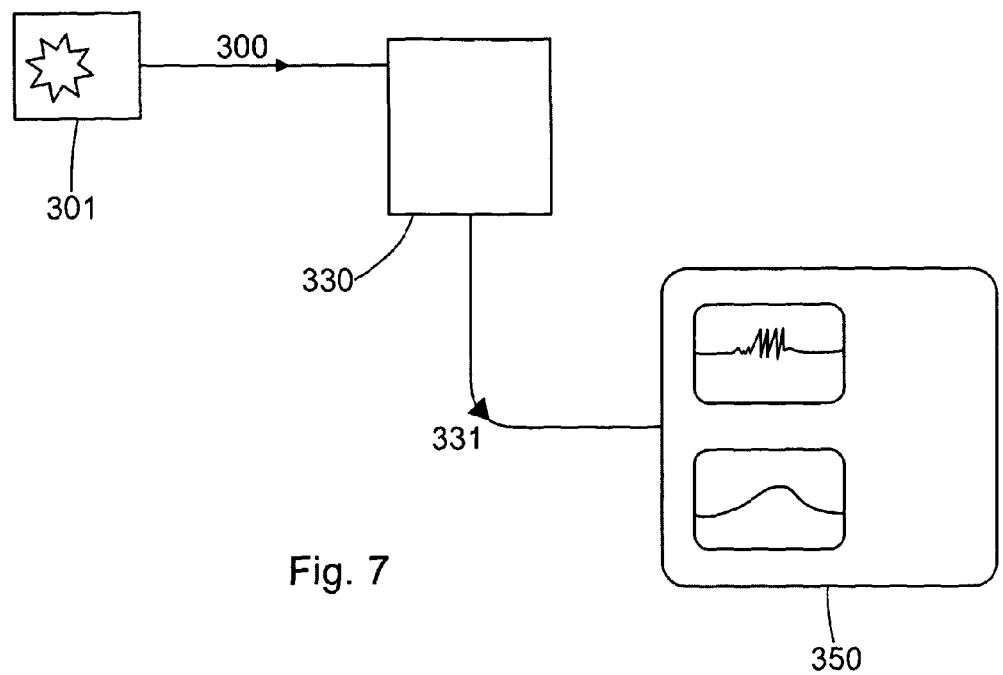
FIG. 7 is a schematic illustration of a spectrometer system.

The interferometer may be incorporated into a spectrometer system, as shown schematically in FIG. 7. The input beam of light 300 such as from a light source 301 is incident on interferometer 330. The interferometer produces a signal 331 based on the intensity of light incident on each pixel of the detector. The signal 331 is input to an analyser 350. The analyser may display an interferogram based on the intensity received at each detector pixel. The analyser provides an output indicative of the wavelengths included in the input beam 300 by performing a Fourier transform of the signal 331 received from the detector. In one embodiment the signal may comprise a number of signals one for each of the pixels in the detector array. The analyser 350 may perform the Fourier transform using a fast Fourier transform (FFT) algorithm.

Figure 8:
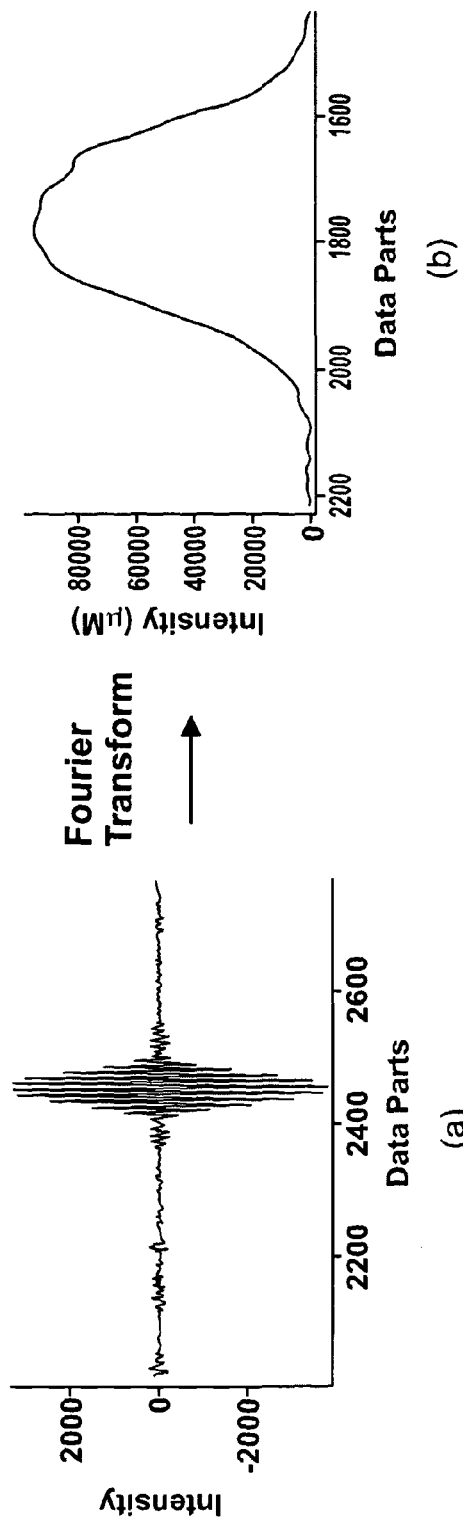
FIGS. 8a and 8b show schematically an interferogram and a wavelength spectrum respectively.

Example results are shown in FIG. 8. FIG. 8a shows the interferogram and FIG. 8b shows the wavelength spectrum. The horizontal scale corresponds to the distance along the detector, that is, the distance in the image plane y. A significant signal is seen between y positions 2400-2500, which may correspond to the pixel number along the detector. The vertical scale on FIG. 8a corresponds to intensity. Along much of the detector no interference occurs and hence the input beam is merely spread out across the detector array. At the region between data points 2400 and 2500 constructive and destructive interference occurs increasing or reducing the intensity incident on the detector pixel to produce significant features in the interferogram. The wavelength spectrum is derived from a Fourier transformation of the interferogram.

Figure 1:
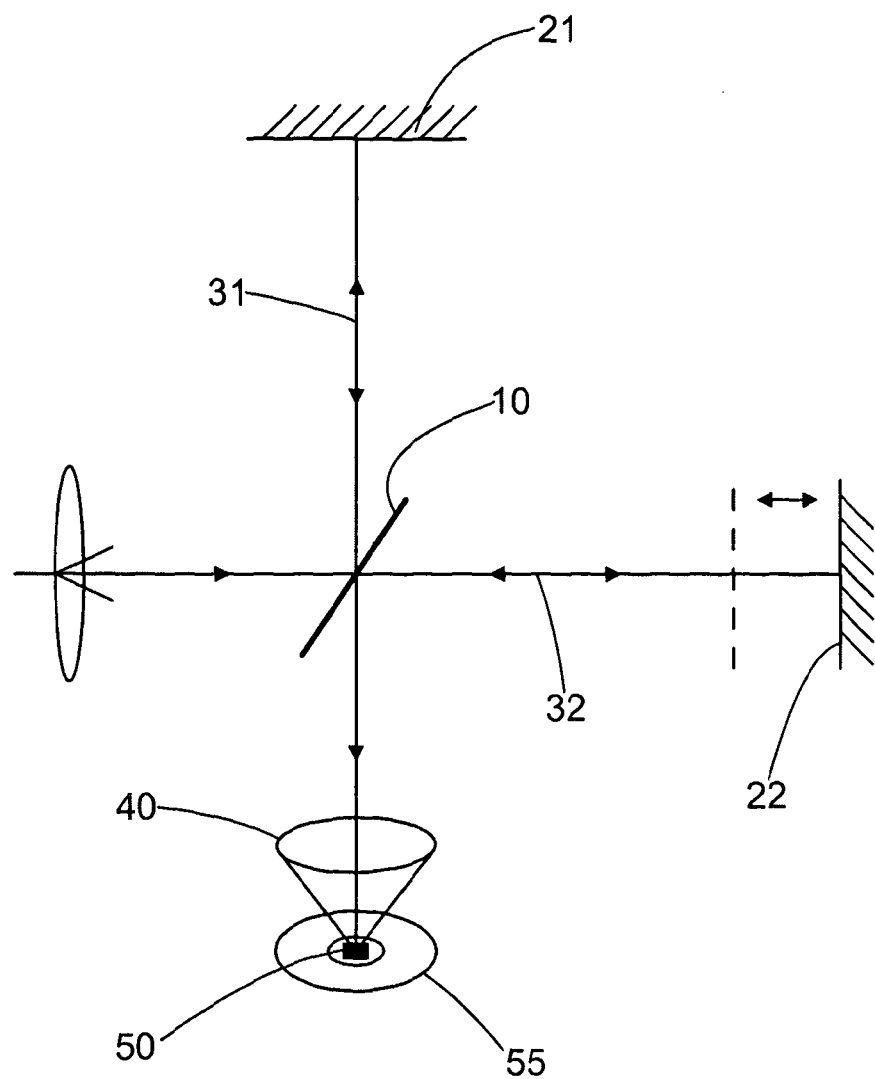
FIG. 1 is a schematic illustration of a conventional Michelson interferometer.
Figure 2:
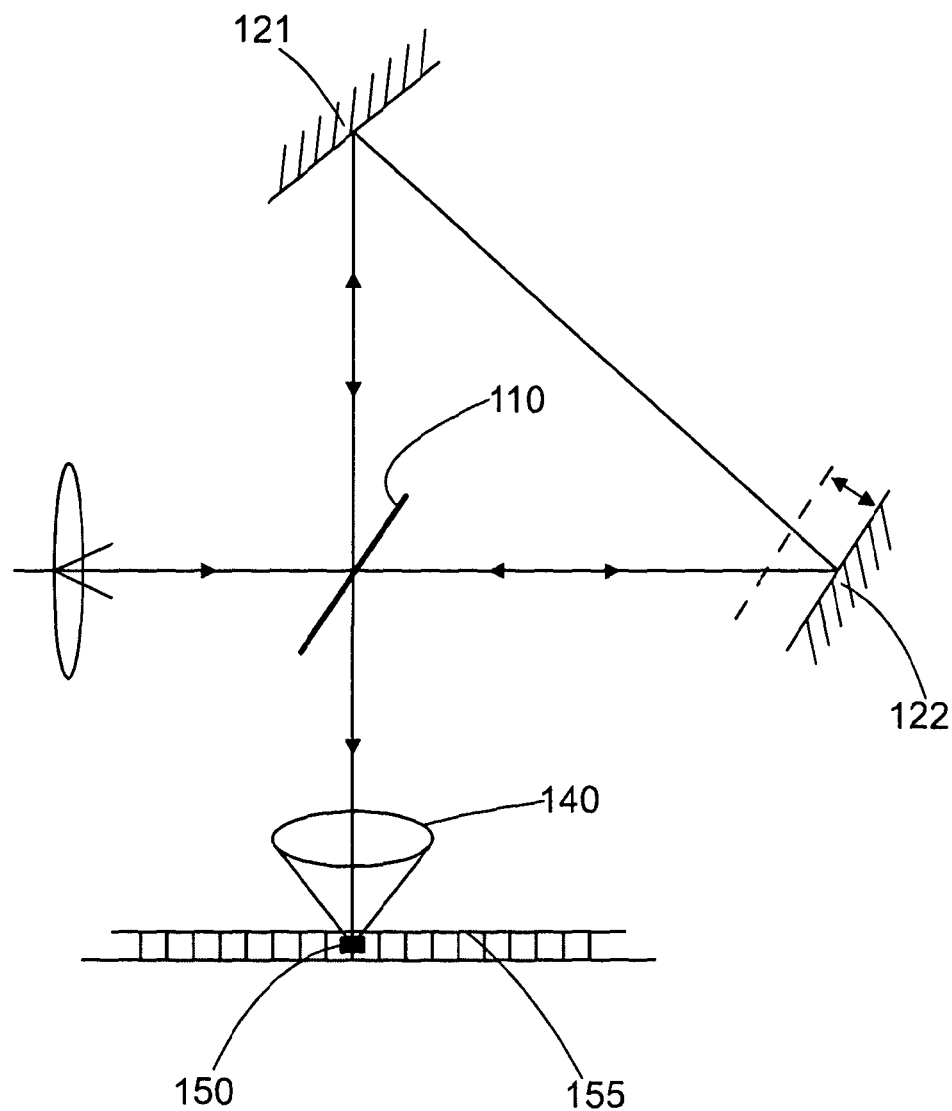
FIG. 2 is a schematic illustration of a conventional Sagnac interferometer.

An advantage of the interferometer according to the present invention is that no mechanical scanning is required. For example, for the conventional Michelson interferometer described by FIG. 1 one of the mirrors is required to be spatially scanned to generate the path difference, and such scanning is required with a very high degree of precision. In the current interferometer, the path difference is produced by the optical configuration and use of a linear detector array so no moving parts are required. Another advantage produced by the current interferometer is that because there are no moving parts, the scan time is in principle very short, limited only by the time taken to readout signals from the detector. This means the interferometer and analyser can provide temporal information on changes in the spectra of the input light, such as providing a graph of wavelengths present in the input beam that is updated in real time, near continuously, or at least many times per second. The lack of moving parts also makes the device suitable for use in hostile environments, such as on satellites, where moving parts are prone to malfunction because of the extremes in temperature and vibration. A further advantage of an interferometer according to the present invention is that because the focussing is incorporated into the mirrors, the interferometer can be made more compact than conventional interferometers.

In another embodiment the linear detector array can be replaced by a single element detector which is mechanically scanned across the image plane. This embodiment may result in a cheaper device, but may be less robust and provide less temporal information on changes in input wavelengths because of the time to move the single element detector across the image plane. Nevertheless, use of a single element detector may provide improved linearity across the image field because the same element is used for sampling across the whole interferogram. In other words, the performance of the detector across the image plane will be unchanged, whereas a detector array will have multiple pixels which may have different performance characteristics from pixel to pixel.

Figure 9:
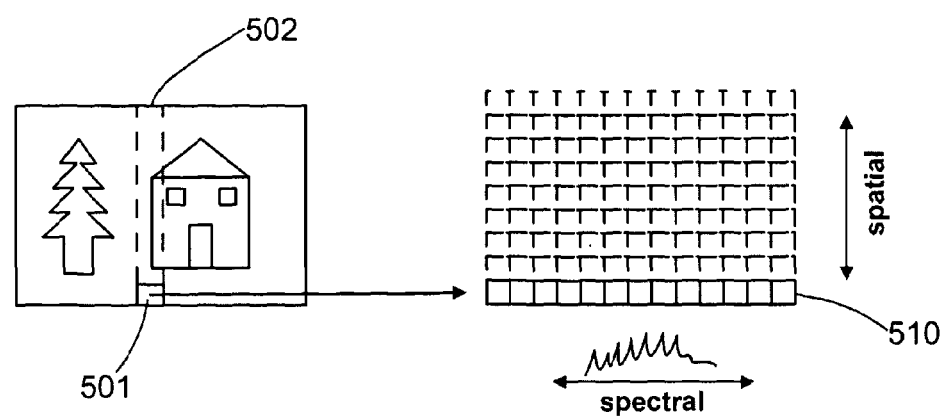
FIG. 9 illustrates how an interferogram and imaging information may be obtained from a detector having a 2-dimensional array of pixels.

In another embodiment the detector comprises a two-dimensional array of pixels. In this embodiment the interferometer may form part of an imaging spectrometer. For example, as shown in FIG. 9 a 2-dimensional detector array provides some limited spatial information on the target scene. The interferometer described above is a pupil plane interferometer.

As shown in FIG. 9, for each point (e.g. 501) along a line 502 of the target scene an interferogram is generated along a line 510 of the 2-dimensional detector array. Thus, the pupil plane interferometer creates a series of interferograms 510 for points such as 501 along line 502. That is, spectral information is provided in one direction and imaging information is provided in the orthogonal direction. In FIG. 9, the spectral information is shown in the horizontal direction. This corresponds to along the line of the detector 250 shown in FIG. 3. The limited spatial information about the target scene is shown as comprised in the vertical direction in FIG. 9, which corresponds to perpendicular to the plane of the page in FIG. 3.

The pupil plane interferometer receives a collimated beam as input beam 205 in FIG. 3.

The interferometer can alternatively be configured to be an image plane interferometer using the same reflecting elements, beamsplitter, and detector in the same relative positions. The image plane interferometer additionally includes input optics such as a binocular or telescope optical system resulting in the focus of the system being at an image rather than at the pupil. This results in the image plane interferometer having an image over the detector thereby providing a DC signal at the detector and a modulation resulting from the interference pattern overlaid over the image. Each pixel in the detector still has its own optical path length difference (OPD) dependent on its position. To generate a complete interferogram for an individual point within the image scene, the point must be scanned across a line of the detector. This technique is known as Time Domain Intergration (TDI) of the signal, and should be completed before the Fourier transform is performed.

As mentioned above, for the image plane interferometer, the interferogram is built up by scanning a point in the image scene across the detector. This can be achieved using a scan mirror in the input optics. Conversely, for the pupil plane interferometer a complete interferogram is already provided but scanning is required to produce a complete image. Again scanning can be performed by using a scan mirror, or by movement of the spectrometer itself.

An image plane spectrometer has the advantage that there is greater signal per pixel for each interferogram than for the pupil plane interferometer. The pupil plane interferometer has the advantage that the signal is evenly distributed across the detector array. The pupil plane interferometer is the focus of this description because it does not require movement of, or movement in, the device to obtain wavelength spectra.

An interferometer has been built using commercial-off-the-shelf (COTS) components. The interferometer uses two Newport Optics concave mirrors with a radius of curvature of 100 mm. The coating on the mirrors is protected aluminium. These mirrors act as mirrors 221, 222 (M1, M2) in FIG. 3. The beamsplitter 210 is a Thorlabs flat plate beamsplitter with a near infrared coating to provide beamsplitting in the range 700-1200 nm. The detector is a 3648 pixel CCD line detector array from Mightex (USA).

To test the interferometer, light was input from a white light tungsten halogen source, supplied by Ocean Optics. The source operates in the visible-NIR, and light is input through a standard fibre optic fed collimator from BiFi Optilas.

The Mightex CCD allowed spectra to be measured in the range 500-1100 nm. The pixel pitch of the 3648 pixel line array detector from Mightex was 7 μm. 5 Megapixel 2-dimensional detectors having a pixel pitch of 2.2 μm have also been used in this example configuration. The wavelength range can be extended using different detectors sensitive to different wavelength regions. For example, an InGaS based detector can detect radiation from 900-2550 nm, and an MCT (HgCdTe) can detect radiation from 5-15 μm. If a broad or different range of wavelengths is desired to be detected, then different coatings on the beamsplitter will be needed.

The footprint of the COTS interferometer is around 40 mm×40 mm and the device has a height of around 25 mm. The spacing between the mirrors and the beamsplitter is approximately 15 mm. The spacing between the beamsplitter and the detector array is around 30 mm. The Mightex 3648 detector array has a length of around 30 mm. The two mirrors are at an angle of around 30° to the beamsplitter plate. The detector is at angle of around 80° to the beamsplitter plate. These angles and distances are only an example and many other configurations are possible.

The components result in an interferometer spectrometer which has a resolution of around 0.1-0.5 nm in the visible light region of the EM spectrum.

The relative position of the mirrors, beamsplitter, and detector are determined using optical modelling software. The software performs the determination of the correct positions and radius of curvature of mirrors 121, 122 to optimally align the spectrometer components such that the detector is at a position where the focus is planar.

The optical components may be varied in many ways, for variations on the above configuration, to optimise for different wavelengths, or to optimise for different size devices.

For example, the beamsplitter, mirrors, and detector may all be changed from those used in the above described COTS device.

The beamsplitter may be varied by changing the optical material used. The material used may be the optimum for the wavelength range of operation required. The choice of available materials may include, for visible light: BK7, quartz, calcium fluoride; and for the infrared: germanium, zinc selenide, or potassium bromide. The beam splitter may also comprise a coating optimised for use at a particular wavelength. The coatings may be antireflection or reflection depending on the type of beamsplitter and which surface of the beamsplitter is coated. Preferably the coating is broadband covering the desired spectral range. As mentioned above, different types of beamsplitter may be used, such as pellicle, or flat plate. One of these is likely to be preferable for the wavelength and environment in which the device is used. The shape of the beamsplitter may also be changed to adjust the characteristic dispersion of the transmitted and reflected light. For example, the shape could be used to compensate for aberrations or be used to chirp the beam. Chirp of the beam may be achieved using a wedge shaped beamsplitter instead of a flat plate type.

The mirrors are shaped to focus the radiation along a flat plane at the detector. This requires the radius of curvature and position of the mirrors to be accurately determined. Changing the radius of curvature of the mirrors changes the focal length and thereby alters the position of the focal plane of the system. Therefore by altering the radius of curvature of the mirrors, the size of the instrument and its spectral resolution can be changed. The two mirrors may also be specified to have different radii of curvature to each other. The mirrors may also have aspheric surfaces to compensate wavefront aberrations. The type of mirror used may also be changed to meet performance requirements. The mirror coating may be gold, silver, or aluminium depending on the wavelength at which the device is operating. Instead of using mirrors a diffraction grating could be used as the optical reflector. A grating would be used to introduce wavelength dependent interference features, or filtering. Deformable mirrors, for which the focal length can be changed mechanically, may also be used.

Parameters such as detector material, number of pixels, and pixel size determine the performance of the device. As mentioned above, 2-dimensional arrays provide imaging information, whereas line arrays provide high sensitivity and fast readout speed. The type of detector used will depend on the wavelength of radiation which is being sampled. Examples of detector types for different wavelengths are:
- visible—CCD, CMOS detectors etc;
- near infrared—InGaAs, InSb, Ge, MCT etc;
- mid infrared—MCT, quantum well infrared photodiode (QWIP); and
- broadband bolometer array.

A single element detector may alternatively be used. The single element may be arranged to mechanical scan across the image plane, as discussed above.

As mentioned above, the interferometer spectrometer can be configured to provide interferogram information only, or using a 2-dimensional detector array can also provide imaging information. The spectrometer may additionally incorporate a local oscillator to heterodyne the input radiation to a wavelength that can be measured by the detector.

The above embodiments have been described using discrete optical components, such as COTS components. However, the device can be fabricated monolithically, such as from a single piece of glass, or micromachined in silicon, or made from separate components which are assembled together to form a single monolithic optical system in which the beamsplitter and mirror surfaces are held together. The optical systems may also be manufactured using MEMS technology (Micro-Electro-Mechanical-Systems) to produce a single detector chip which incorporates the optics and electronics, namely a "lab-on-a-chip" system.

Figure 10:
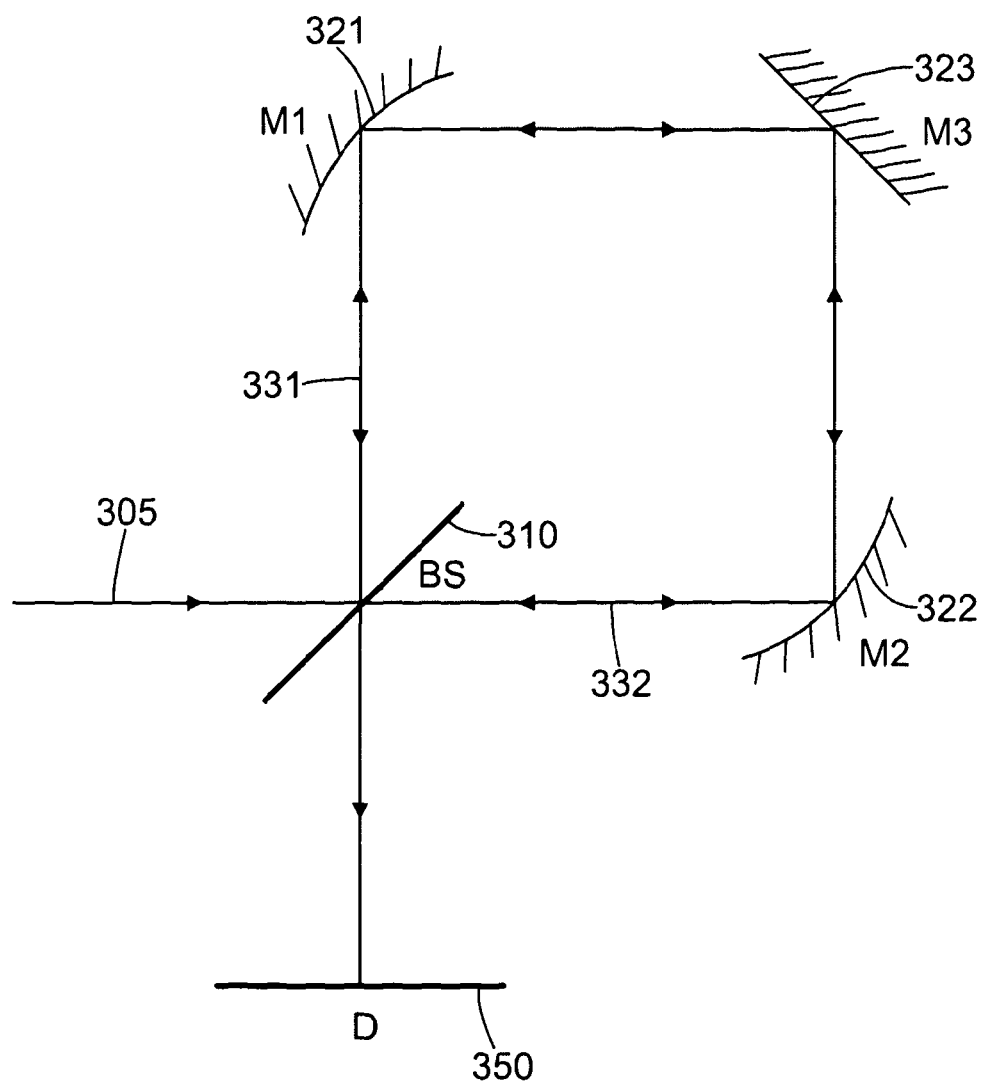
FIG. 10 is a schematic illustration of an interferometer according to an alternative embodiment of the present invention.

Other optical configurations are possible in which the focussing or Fourier optics are included in the enclosed path. For example, FIG. 10 shows an optical arrangement which includes an additional mirror compared to the embodiment of FIG. 3. The enclosed path taken by the light is approximately square or rectangular compared to the triangular path shown in FIG. 3. The embodiment of FIG. 10 includes a beamsplitter or light divider 310, a detector 350, and three mirrors 321, 322, 323. The mirrors 321, 322, 323 may comprise one, two or three curved mirrors with the remaining mirrors being plane mirrors. In the arrangement of FIG. 10, two curved mirrors are shown at 321 and 322, and a plane mirror at 323. Input beam 305 is again preferably a collimated beam. The input beam is incident on light divider 310 which produces a reflected beam 331 and transmitted beam 332. The reflected beam 331 travels around a path BS-M1-M3-M2-BS-D, finishing incident on detector D. The transmitted beam 332 travels around a path BS-M2-M3-M1-BS-D, also finishing incident on detector D. Similar to FIG. 3 the alignment of the mirrors results in a small path length difference between the two paths. The path length difference results in interference at the detector, thereby producing an interferogram similar to those described above.

Other optical configurations are possible which include the Fourier optics in the enclosed path. The path length difference between the alternate paths should also be much less than the coherence length for the light being analysed. The embodiment of FIG. 10 has more components and may therefore be more difficult to set up or align.

Further alternative embodiments are possible in which the two beams generated by the beamsplitter do not propagate in opposite directions around an enclosed path. For example, a beamsplitter may be provided which generates first and second beams which are separated by a smaller angle than the 90° of FIG. 3, such as 30°. Two curved concave mirrors may then be arranged to direct the first and second beams to the detector. In this embodiment the mirrors may be spaced apart and both face the same direction. In embodiments in which the first and second beams are not directed around enclosed paths, the interferometer continues to be compact because the focussing effect is provided by the mirrors. The advantage of a reduced number of optical components is a further advantage of all embodiments. Nevertheless, the embodiment of FIG. 3 has a further advantage in that alignment of the optical components to produce an interferogram is relatively straight forward and is sometimes considered to be self-aligning.

Applications in which the interferometer spectrometer device of the present invention may find use are numerous and varied. The device of the present invention may find application in: atmospheric pollution monitoring (such as in-situ monitoring in urban or industrial areas, or deployment on UAVs, balloons, or rocketsondes), chemical processing sensors (such as in-situ on-line measurements of chemical processes used in large scale pharmaceutical or petrochemical productions plants, counter terrorism or military applications for detection and analysis of chemicals and explosives), atmospheric remote sensing and other scientific measurements, environmental testing (i.e. hazardous materials testing, roadside vehicle emissions testing, gas leak monitoring), medical diagnosis such as testing for diabetes through breath analysis, etc. In some embodiments the device may be used to fingerprint for chemicals. Since the device is based on a Sagnac interferometer, the device may also be used as an accelerometer.

The person skilled in the art will appreciate that various further modifications and alterations may be made to the above described apparatus without departing from the scope of the appended claims. For example, the interferometer has been described for use with visible and infrared wavelengths, but is not to be limited to these wavelengths and can be used at other wavelengths. Optical components or coatings may require optimization for the particular wavelength used.

The invention claimed is:

1. An interferometer, comprising:
path differencing optics and a detector, wherein:
the path differencing optics comprise at least two reflecting elements and a beamsplitter, the beamsplitter is arranged to divide an input beam into first and second beams respectively traversing first and second paths towards the detector, the first and second beams are respectively directed to first and second reflecting elements, the first reflecting element is arranged to direct the first beam to the second reflecting element, the second reflecting element is arranged to direct the first beam to the beamsplitter and on towards the detector, the second reflecting element is arranged to direct the second beam to the first reflecting element, the first reflecting element is arranged to direct the second beam to the beamsplitter and on towards the detector, the first and second paths having an optical path difference; and
the detector is arranged to detect a pattern produced by interference of the first and second beams, and
wherein the first and second reflecting elements are concavely curved to focus the first and second beams onto the detector; and
the path differencing optics are arranged such that the first and second beams as they leave the beamsplitter for the detector are offset with respect to each other such that there is a shear angle between the beams.

2. The interferometer of claim 1, wherein the curvature of the reflecting elements is arranged to focus the first and second beams onto the detector such that the shape of the optical field at the image plane substantially matches the shape of the detecting surface of the detector.

3. The interferometer of claim 1, wherein the curvature of the reflecting elements is arranged to focus the first and second beams such that the image plane has a flat optical field at the surface of the detector.

4. The interferometer of claim 1, wherein the beamsplitter produces the first and second beams by transmission and reflection respectively, and subsequently directs the first and second beams to the detector by transmission and reflection respectively.

5. The interferometer of claim 1, further comprising input optics to collimate the input beam.

6. The interferometer of claim 5, wherein the input optics comprise a telescope or binocular arrangement.

7. The interferometer of claim 1, wherein the curvature of the two reflecting elements are the same.

8. The interferometer of claim 1, wherein the detector is arranged to detect along a line the pattern produced by interference of the first and second beams.

9. The interferometer of claim 8, wherein the detector is a linear array of sensors.

10. The interferometer of claim 8, wherein the detector comprises at least one sensor arranged to move to scan along a line.

11. The interferometer of claim 1, wherein the enclosed paths comprise triangular paths.

12. The interferometer of claim 1, wherein the reflecting elements and beamsplitter are fixed relative to each other.

13. The interferometer of claim 1, wherein the detector is fixed relative to the path differencing optics.

14. The interferometer of claim 1, wherein the beamsplitter divides the input beam into first and second beams of substantially equal intensity.

15. The interferometer of claim 1, wherein the path differencing optics, or reflecting elements and beamsplitter, are formed monolithically.

16. The interferometer of claim 1, wherein the detector is arranged to output a signal indicative of the spatial variation in the interference pattern.

17. A spectrometer comprising the interferometer of claim 16, and further comprising an analyser arranged to provide an indication of wavelengths present in the input beam based on a Fourier transform of the interference pattern.

18. An imaging spectrometer comprising the interferometer of claim 1, wherein the detector is arranged to detect in 2-dimensions the pattern produced by combining the first and second beams.

19. The imaging spectrometer of claim 18, wherein the detector is arranged to detect in one direction the spatially varying pattern produced by interference of the first and second beams, and detect in a second direction image information about the input beam.

20. The imaging spectrometer of claim 19, wherein the detector is a 2-dimensional array of sensors.

21. The imaging spectrometer of claim 19, wherein the detector is a linear array of sensors arranged to move along a line to scan an area.

22. The imaging spectrometer of claim 19, further comprising an analyser arranged to provide an indication of wavelengths present in the input beam, and image information regarding the input beam.

23. The interferometer of claim 1, wherein the path differencing optics are arranged such that first and second beams are directed in opposite directions around paths between the beamsplitter, the first reflecting element and the second reflecting element.

24. The interferometer of claim 1 wherein the path differencing optics are arranged to provide the interference pattern of the first and second beams such that the interference pattern is spread out across the detector plane.

25. The interferometer of claim 1, wherein the two reflecting elements are formed together as one unit.

26. An interferometer, comprising path differencing optics and a detector, wherein:
the path differencing optics comprise a reflecting unit having a first reflecting portion and a second reflecting portion and a beamsplitter, the beamsplitter is arranged to divide an input beam into first and second beams respectively traversing first and second paths towards the detector, first and second beams respectively directed to first and second reflecting portions, the first reflecting portion is arranged to direct the first beam to the second reflecting portion, the second reflecting portion arranged to direct the first beam to the beamsplitter and on towards the detector; the second reflecting portion is arranged to direct the second beam to the first reflecting portion, the first reflecting portion arranged to direct the second beam to the beamsplitter and on towards the detector, the first and second paths having an optical path difference; and
the detector is arranged to detect a pattern produced by interference of the first and second beams,
wherein the first and second reflecting portions are concavely curved to focus the first and second beams onto the detector; and
the path differencing optics are arranged such that the first and second beams as they leave the beamsplitter for the detector are offset with respect to each other such that there is a shear angle between the beams.

27. The interferometer of claim 26, wherein the path differencing optics are arranged such that first and second beams are directed in opposite directions around paths between beamsplitter, first reflecting portion and second reflecting portion.

28. The interferometer of claim 26, wherein the path differencing optics are arranged to provide the interference pattern of the first and second beams such that the interference pattern is spread out across the detector plane.

* * * * *